US008787296B2

(12) United States Patent
Dong

(10) Patent No.: US 8,787,296 B2
(45) Date of Patent: *Jul. 22, 2014

(54) METHOD FOR ALLOWING A UICC TO MANAGE THE PDP CONTEXT PARAMETERS

(71) Applicant: Olivier Dong, Draveil (FR)

(72) Inventor: Olivier Dong, Draveil (FR)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/770,698

(22) Filed: Feb. 19, 2013

(65) Prior Publication Data

US 2013/0155901 A1 Jun. 20, 2013

Related U.S. Application Data

(63) Continuation of application No. 12/733,255, filed as application No. PCT/JP2008/065054 on Aug. 14, 2008.

(30) Foreign Application Priority Data

Aug. 21, 2007 (EP) .................................... 07114694

(51) Int. Cl.
 H04W 76/02 (2009.01)
(52) U.S. Cl.
 USPC ....................................................... 370/329
(58) Field of Classification Search
 USPC .......... 370/329, 230, 419, 420, 421; 455/558, 455/557
 See application file for complete search history.

(56) References Cited

U.S. PATENT DOCUMENTS

| 7,353,017 B2 | 4/2008 | Chen et al. |
| 2004/0037269 A1* | 2/2004 | Lundin .................... 370/352 |
| 2005/0083899 A1 | 4/2005 | Babbar et al. |

(Continued)

FOREIGN PATENT DOCUMENTS

| CN | 1647490 A | 7/2005 |
| CN | 1768538 A | 5/2006 |

(Continued)

OTHER PUBLICATIONS

"Smart Cards; Card Application Toolkit (CAT) (ETSI T 102 223 v7.7.0,Jul. 2007)".

(Continued)

*Primary Examiner* — Thai Nguyen
(74) *Attorney, Agent, or Firm* — McGinn IP Law Group, PLLC

(57) ABSTRACT

A method for allowing a Universal Integrated Circuit Card (UICC) to set up data bearer parameters for wireless communication between a User Equipment (UE) and a remote server in a telecommunication network, the UE including the UICC and a mobile equipment, the method including the UICC sending to the mobile equipment Packet Data Protocol (PDP) context parameters within a specific command defined for activating a PDP context, on reception of the specific command, the mobile equipment transmitting a PDP context activation request, including an access point name and the parameters received in the specific command, to the telecommunication network, on reception of the PDP context activation request, the telecommunication network transmitting to the mobile equipment a confirmation for a PDP context activation, and the mobile equipment, on receipt of the confirmation, sending a response message to the UICC for confirming a successful command performance.

5 Claims, 2 Drawing Sheets

(56) References Cited

U.S. PATENT DOCUMENTS

2005/0235149 A1* 10/2005 Beckmann et al. ............ 713/168
2005/0259673 A1* 11/2005 Lu et al. .......................... 370/419
2006/0079284 A1    4/2006 Lu et al.

FOREIGN PATENT DOCUMENTS

| WO | WO 02/09451 A2    | 1/2002 |
| WO | WO 0209451 A2 *   | 1/2002 |
| WO | WO 03/005669 A1   | 1/2003 |
| WO | WO 2006/032993    | 3/2006 |

OTHER PUBLICATIONS

Office Action dated Mar. 7, 2013 in U.S. Appl. No. 12/733,255.
English translation of Chinese Office Action dated Aug. 3, 2012.
3rd Generation Partnership Project, "Technical Specification Group GERAN; Enhanced Generic Access Networks Study (EGAN)" (Release 8), 3GPP TR 43.902 VI. 1.0 (Feb. 2007).
ETSI, "Smart cards; New UICC-Terminal Interface; Internet Protocol Connectivity Between UICC and Terminal" (Release 7), ETSI TS 102 YY V0.3.0 (May 2006).
ETSI, Smart Cards; Card Application Toolkit (CAT)(Release 7), ETSI TS 102 223 V7.5.0 (Oct. 2006).
Office Action dated May 25, 2012 in U.S. Appl. No. 12/733,255.
Office Action dated Oct. 16, 2012 in U.S. Appl. No. 12/733,255.
Advisory Action dated Jan. 31, 2013 in U.S. Appl. No. 12/733,255.
International Search Report (PCT/ISA/ 210) dated Oct. 21, 2008.
Written Opinion of the ISA (PCT/ISA/237).
PCT/IB/373 issued on Mar. 27, 2007.
Office Action dated Aug. 21, 2013 in U.S. Appl. No. 12/733,255.

* cited by examiner

METHOD FOR ALLOWING A UICC TO MANAGE THE PDP CONTEXT PARAMETERS

RELATED APPLICATIONS

The present application is a Continuation Application of U.S. patent application Ser. No. 12/733,255, filed on Feb. 19, 2010, which is the National Stage of International Application No. PCT/JP2008/065054 filed on Aug. 14, 2008, and claiming the benefit of priority of EP 07114694.8, filed on Aug. 21, 2007, the entire contents of which are incorporated herein by reference.

TECHNICAL DOMAIN

The present invention pertains to wireless telecommunication field and concerns a method for setting up data bearer parameters for a TCP/IP connection between a User Equipment (UE) and a remote server among a plurality of remote servers located in an telecommunication operator network, said UE comprising a UICC and a Mobile Equipment (ME) having each a TCP/IP stack.

More specifically, the invention aims at allowing the UICC (Universal Integrated Circuit Card) to set up data bearer parameters.

STATE OF PRIOR ART

It is expected that in ETSI SCP Rel-7, the UICC will include its own TCP/IP stack that would provide an internet connectivity solution.

Up to now, the internet connectivity was provided by the BIP (Beater Independent Protocol) which allows the UICC to create several data connections to different remote servers (gateways/APN) with different connection parameters (e.g. different bearer types, QoS, . . . ). Such flexibility is very useful for the Operators since they can easily setup services/gateways with different corresponding tariffs.

In the current TCP/IP internet connectivity specifications (ETSI TS 102 483), there is no mechanism for the UICC to provide the Mobile Equipment (ME) with the parameters (PDP context parameters) of data connections that will be used by Application located on the UICC to communicate with a remote server. The UICC can only indicate the remote server IP address to the Mobile Equipment. Consequently, the Mobile Equipment will use some default parameters to establish the data connection.

Since the data connection over TCP/IP should replace the SIP from rel-7 applications onwards, it is therefore desirable that this new feature should have at least the same capability/flexibility as provided by the BIP.

Moreover, a PDP context could be already activated prior to the request from the UICC (activated for a Mobile Equipment (ME) Application for example). That means a PDP context could be already activated prior to any request from the UICC (asking for a PDP context activation for a UICC application). Two situations may occur:

In case the Mobile Equipment (ME) do not support the Multiple PDP context feature, any further PDP activation request (e.g. from the UICC) will be rejected as the only supported PDP context is already activated.

In case the Mobile Equipment (ME) supports the Multiple PDP context feature, the activation of a new PDP context may not be needed if the current PDP Context parameters already fit the UICC needs.

Therefore, a new notification mechanism would be very useful to enhance the behaviour and avoid any redundant/useless operations.

A first object of the invention is to allow a UICC associated with a Mobile Equipment in a wireless User Equipment (UE) to provide said Mobile Equipment (ME) with the bearer parameters for data connections (PDP context parameters) using the TCP/IP protocol for example in GPRS/3G packet service or HSDPA/UTRAN packet service with extended parameters.

A second object of the invention is to allow the ME to notify the UICC about any status change of any PDP context (activation or deactivation) and its associated parameters.

In order to anticipate the future evolution of the UICC, i.e. since the flash memory technology will allow the storage capacity in the UICC to reach few Gigabytes, it is expected that a growing number of applications will be implemented in the UICC, and especially applications which need a connection with a remote network data server.

Such situation could lead the UICC to request the Mobile equipment to quite often activate/deactivate PDP contexts for all these applications.

Therefore, another third object of the present inventions is a method to better handle this situation by avoiding too much redundant operations.

PRESENTATION OF THE INVENTION

The first object of the invention is achieved by means of a method comprising the following steps:

the UICC sends to the Mobile Equipment (ME) the PDP context parameters within a specific command defined for activating or deactivating a PDP context, On reception of said specific command, the Mobile Equipment transmits a PDP context activation or deactivation request to the Network with the parameters received in said specific command, on reception of said request, the Network transmits to the Mobile Equipment a confirmation for a PDP context activation or for a PDP context deactivation, The Mobile Equipment forwards said confirmation to the UICC.

To achieve the second object, the method according to the invention further comprises the following steps, the Mobile Equipment informs the UICC about any status change of a PDP context activation or deactivation, and sends the related PDP context parameters to the UICC, The UICC registers to a PDP context related event, and when a PDP context status change occurs, the Mobile Equipment sends a notification to the UICC with the new status and the related data.

To achieve the third object, the method according to the invention further comprises the following steps:

defining a preferred APN (Access Point Name) usable by as many UICC applications as possible, Indicating in said specific command that the PDP context for the indicated APN should be kept activated as much as possible (i.e. if for any reason, this PDP context is deactivated, the ME shall re-activate it as soon as possible).

According to another feature of the invention, the PDP context parameters could be dynamically updatable from the Network side using the Over The Air mechanism.

In a preferred embodiment of the invention, in case a PDP context is already activated for a Mobile Equipment Application prior to the request from the UICC, and in case the current parameters of the already activated PDP context fit the UICC needs, the Mobile Equipment notifies the UICC about the parameters of the already activated PDP context in order to avoid redundant operations of the UICC.

BRIEF DESCRIPTION OF THE FIGURES

The forgoing summary, as well as the following detailed description, will be better understood when read in conjunction with the appended figures in which.

DETAILED PRESENTATION OF PARTICULAR EMBODIMENTS

Figure 1:
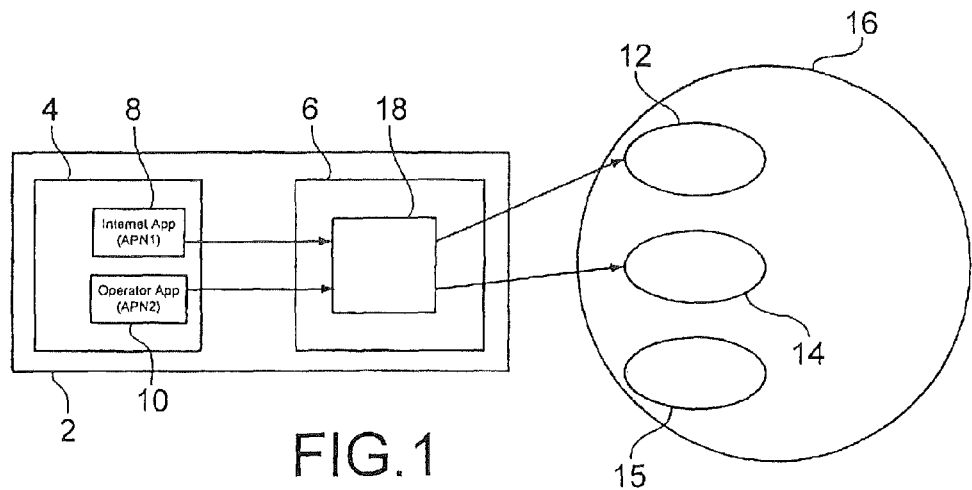
FIG. 1 represents a system in which the method according to the invention is implemented.

FIG. 1 schematically represents a User Equipment (UE) 2 comprising a UICC 4 and a Mobile Equipment (ME) 6. Each one of the UICC 4 and the ME 6 includes a TCP/IP stack. The UICC 4 further comprises at least a first application 8 (an Internet Application or an operator Application 10 or any other) that exchanges data with a remote server (respectively with a first remote server 12 and a second remote server 14 located in the operator Network 16 in this example). The ME 6 further comprises a Routing/Network Address Translation Module 18.

Before rel-7, the Internet Application 8 or the operator Application 10 used the BIP (Bearer Independent Protocol) connectivity solution on the ME-UICC interface to connect to a remote client/server.

The BIP protocol allows the UICC 4 to create several data connections to different remote servers with different connection parameters (e.g. different bearer types, QoS, . . . ), by associating an Access Point Name (APN) representing a remote server of the Operator Network 16 to each application of the UICC 4.

Since the data connection over TCP/IP should progressively replace the BIP from rel-7 onwards, it is then desirable that the main bearer parameters of a data connection (mainly QoS and the PDP type parameter (i.e. IP) may be provided by the UICC 4 to the ME 6 via a protocol other than the BIP.

According to one embodiment of the invention, a specific command e.g. SET PDP CONTEXT Request is defined for activating or deactivating a PDP context. The structure of said SET PDP CONTEXT request is given in the following table:

| Description | Clause | M/O/C | Min |
|---|---|---|---|
| command Tag | New tag value to be defined (e.g. 0x10) | M | Y |
| Length (Z) | — | M | Y |
| PDP context parameters | See definition below | M | Y |

The corresponding new TLV data object: PDP context parameters is given in the following table:

| Byte(s) | Description | Length |
|---|---|---|
| 1 | PDP context parameters tag (e.g. 0x53) | 1 byte |
| 2 | Length (Y) | 1 byte |
| 3 | PDP context status | 1 byte |
| 4 | Bearer type | 1 byte |
| 5 to X + 4 | Bearer parameters | X bytes |
| X + 5 | Type of IP address | 1 |
| (X + 6) to (X + 9) or (X + 6) to (X + 21) | IP address | 4 or 16 bytes |

PDP Context Status
'00'=deactivation/deactivated
'01'=activation/activated
'11'=activation/activated as "always on" or "permanent"
Other values are RFU (Reserved for Future Use)
Bearer Type
'01'=GPRS/3G packet service.
'02'=UTRAN packet service with, extended parameters/HSDPA.
Other values are RFU.
Bearer Parameters (Example for GPRS/3G Packet Service X=6 bytes
Byte 2: Precedence class
Byte 3: Delay class
Byte 4: Reliability class
Byte 5: Peak throughput class
Byte 6: Mean throughput class
Byte 7: Packet data protocol type: '02'=IP (Internet Protocol)
Type of IP Address:
'21'=IPv4 address
'57'=IPv6 address
IP Address If Type of IP address indicates IPv4, bit 8 of byte (X+6) represents the most significant bit of the IP address and bit 1 of byte (X+9) the least significant bit.

If Type of IP address indicates IPv6, bit 8 of octet (X+6) represents the most significant bit of the IP address and bit 1 of byte (X+21) the least significant bit.

Moreover, a New command "SET PDP CONTEXT Response" is defined as follows:

| Description | Clause | M/O/C | Min |
|---|---|---|---|
| command Tag | New tag value to be defined (e.g. 0x11) | M | Y |
| Length | 2 bytes | M | Y |
| Result | See definition below | M | Y |

Result (2 bytes):
Coding of $1^{st}$ byte:
  '00'=Command performed successfully;
  '01'=Command performed with partial comprehension;
  '02'=Command performed, with missing information;
  '20'=Mobile equipment 6 currently unable to process command;
  '21'=Network currently unable to process command;
  '22'=User did not accept the command;
  '30'=Command beyond Mobile equipment 6's capabilities;
  '31'=Command type not understood by Mobile equipment 6;
  '32'=Command data not understood by Mobile equipment 6;

Coding of $2^{nd}$ Byte:

In case the $1^{st}$ byte is '3x', the Mobile equipment 6 may indicate the failure cause in the $2^{nd}$ byte.

Furthermore, a new EVENT REGISTRATION command is defined as follows:

| Description | Clause | M/O/C | Min |
|---|---|---|---|
| command Tag | New tag value to be defined (e.g. 0x20) | M | Y |
| Length | — | M | Y |
| Event list | See definition below | M | Y |

According to the invention the Event List is defined as follows:

| Byte(s) | Description | Length |
|---|---|---|
| 1 | Event list tag | 1 |
| 2 to Y + 1 | Length (X) of bytes following | Y |
| Y + 2 to X + Y + 1 | Events | X |

Events:
  content: A list of events, of variable lengths. Each byte in the list defines an event. Each event type shall not appear more than once within the list;
  coding: Each byte in the event list shall be coded with one of the values below:
    '00'=MT call;
    '01'=Call connected;
    . . .
    '10'=Frames Information Change;
    '30'=PDP context status The UICC 4 shall register to this PDP context status event using the EVENT REGISTRATION command in order to be notified by the Mobile equipment 6 about any PDP context status change.

The Mobile equipment 6 shall send an EVENT NOTIFICATION command (new command defined below) to the UICC (in case the UICC has previously registered to the event described just above) including the "PDP context parameters" data object defined above.

In addition, a new EVENT NOTIFICATION command is defined as follows:

| Description | Clause | M/O/C | Min |
|---|---|---|---|
| command Tag | New tag value to be defined (e.g. 0x21) | M | Y |
| Length | — | M | Y |
| Event list | See definition above | M | Y |
| PDP context parameters | See definition in the command description section above | M | Y |

Event list: the event list object shall contain the PDP context status event
PDP context parameters shall contain the PDP context data as described in part A.

Implementation of the "Always on" or "Permanent" PDP Context for UICC Applications:

In order to activate a PDP context as an "Always On" or "permanent" PDP context (i.e. a PDP context that the ME shall keep activated as much as possible), the UICC shall set the "PDP context status" parameter in the "PDP context parameters" data object to '11' as described in the part A of this paragraph.

The Mobile equipment 6 shall activate this PDP context in case it supports the multiple PDP contexts or in case there is no existing PDP context yet.

Figure 2:
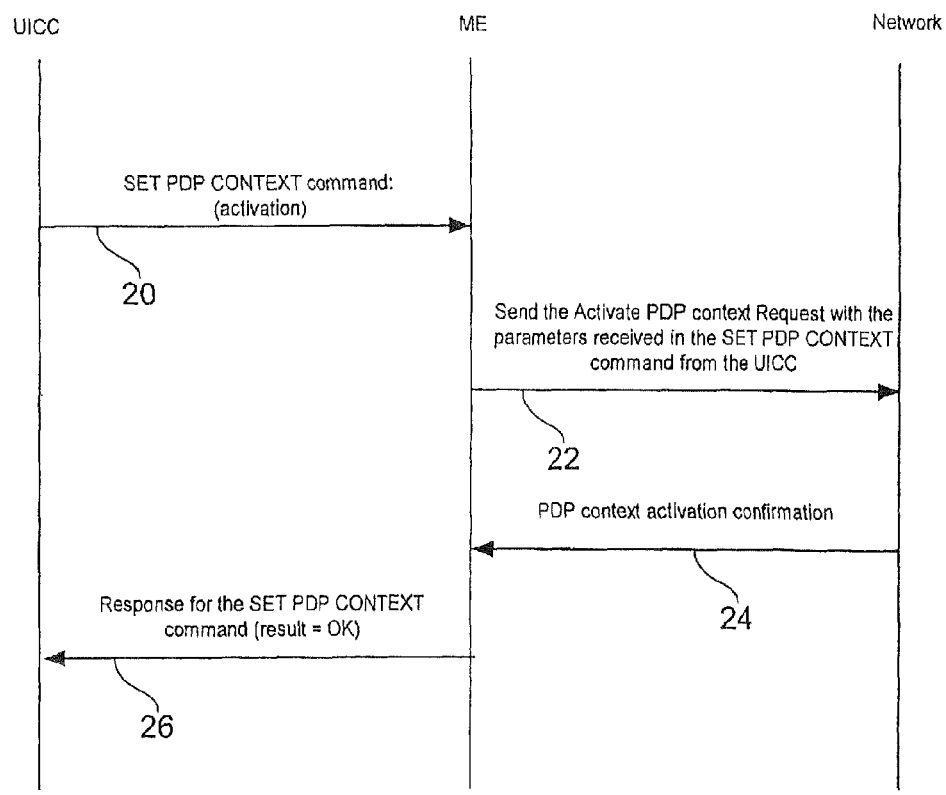
FIG. 2 is a flow chart illustrating the mains steps of the method according to the invention.

FIG. 2 illustrates the main steps of the method according to this embodiment of the invention.

The UICC 4 transmits to the ME 6 the dedicated command "SET PDP CONTEXT" (arrow 20).

On reception of said specific command, the Mobile Equipment 6 transmits (arrow 22) a PDP context request to the Network with the parameters received in said specific command, On reception of said PDP context request the Network transmits to the Mobile Equipment 6 (arrow 24) a confirmation for a PDP context activation.

The Mobile Equipment 6 forwards (arrow 26) said confirmation to the UICC 4.

Figure 3:
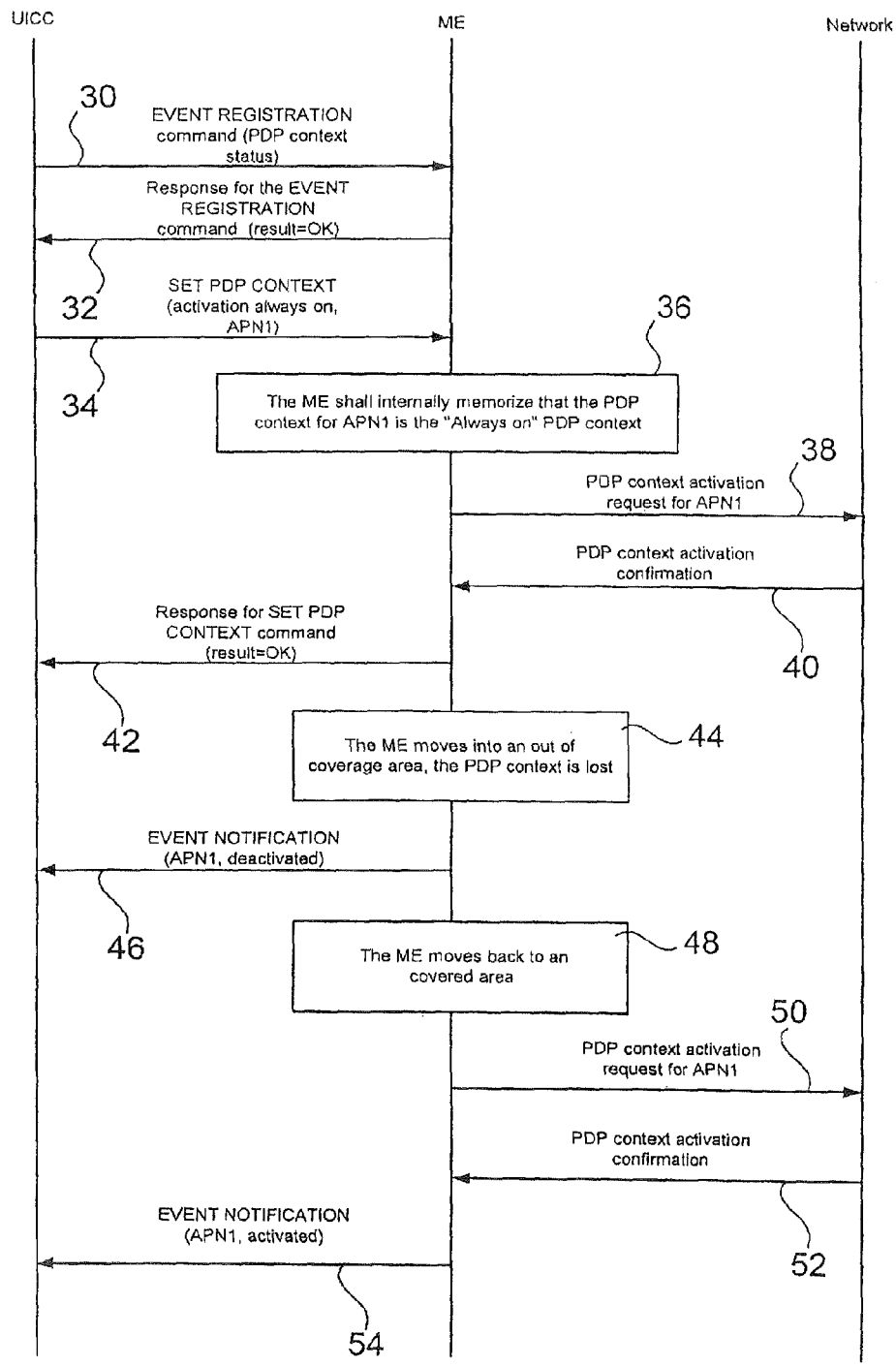
FIG. 3 is a flow chart illustrating a particular embodiment of the invention.

FIG. 3 illustrates the main steps of the implementation of invention with an "Always on" PDP context for UICC applications.

In order to be notified by the ME 6 about any PDP context status change, the UICC register to the new event EVENT REGISTRATION (arrow 30).

The Mobile equipment 6 transmits a response for the EVENT REGISTRATION (arrow 32) to the UICC 4.

On reception of said response (or later on), the UICC 4 set the "PDP context status" parameter in the "PDP context parameters" for APN1 data object to '11' as described above (arrow 34).

At step 36, the ME 6 memorizes the PDP context for APN1 as an "always on" PDP context, and sends a PDP context activation request for APN1 to the Network (arrow 38).

The Network sends back to the ME 6 a confirmation for the PDP context activation (arrow 40).

The ME 6 forwards to the UICC 4 the confirmation for the SET PDP CONTEXT command (arrow 42).

If the ME 6 moves to an out of coverage area where the PDP context is lost (step 44), it sends an EVENT NOTIFIACTION (APN1, deactivated) to the UICC 4 (arrow 46).

And If the ME 6 moves back to a covered area (step 48), it sends to the Network a PDP context activation request for APN1.

The Network sends back to the ME 6 a confirmation for a PDP context activation for APN1 (arrow 52).

The ME 6 notify the UICC 4 of the said confirmation (arrow 54).

The methods according to the invention may be implemented in UICCs and Mobile equipments in any 3GPP wireless telecommunication system from Rel-7 onwards.

The invention claimed is:

1. A method for allowing a Universal Integrated Circuit Card (UICC) to set up data bearer parameters for wireless communication between a User Equipment (UE) and a remote server in a telecommunication network, said UE comprising said UICC and a mobile equipment, said method comprising:
  the UICC sending to the mobile equipment Packet Data Protocol (PDP) context parameters within a specific command defined for activating a PDP context, said specific command comprising an access point name for identifying said remote server;
  on reception of said specific command, the mobile equipment transmitting a PDP context activation request, including said access point name and the PDP context parameters received in said specific command, to the telecommunication network;

on reception of said PDP context activation request, the telecommunication network transmitting to the mobile equipment a confirmation for a PDP context activation; and the mobile equipment, on receipt of the confirmation, sending a response message to the UICC for confirming a successful command performance, wherein, in a case a PDP context is already activated for a mobile equipment application prior to said specific command from the UICC, and in a case current parameters of the already activated PDP context fit UICC needs, said mobile equipment notifies the UICC about parameters of the already activated PDP context.

2. The method according to claim 1, wherein the mobile equipment informs the UICC about a status change of a PDP context activation, and sends related PDP context parameters to the UICC, wherein the UICC registers to a PDP context related event, and wherein, when the status change of the PDP context activation occurs, the mobile equipment sends a notification to the UICC with a new status and related data.

3. The method according to claim 1, wherein said PDP context parameters are dynamically updatable from a network side using an Over The Air mechanism.

4. A method performed by a mobile equipment for allowing a Universal Integrated Circuit Card (UICC) to set up data bearer parameters for a wireless communication between a user equipment and a remote server in a telecommunication network, said user equipment comprising said UICC and said mobile equipment, said method comprising:

receiving from the UICC Packet Data Protocol (PDP) context parameters within a specific command defined for activating a PDP context, said specific command comprising an access point name for identifying said remote server;

on reception of said specific command, transmitting a PDP context activation request, including said access point name and the PDP context parameters received in said specific command, to the telecommunication network;

receiving from the telecommunication network a confirmation for a PDP context activation; and on said receiving of the confirmation, sending a response message to the UICC for confirming a successful command performance, wherein, in a case a PDP context is already activated for a mobile equipment application prior to said specific command from the UICC, and in a case current parameters of the already activated PDP context fit UICC needs, said mobile equipment notifies the UICC about parameters of the already activated PDP context.

5. A mobile equipment for allowing a Universal Integrated Circuit Card (UICC) to set up data bearer parameters for a wireless communication between a user equipment and a remote server in a telecommunication network, said user equipment comprising said UICC and said mobile equipment, said mobile equipment comprising:

a receiver operable to receive from the UICC Packet Data Protocol (PDP) context parameters within a specific command defined for activating, said specific command comprising an access point name for identifying said remote server; and a transmitter operable to, on a reception of said specific command, transmit a PDP context activation request, including said access point name and the PDP context parameters received in said specific command, to the telecommunication network, the receiver being operable to receive from the telecommunication network a confirmation for a PDP context activation, and the transmitter being operable to, on a receipt of the confirmation, send a response message to the UICC for confirming a successful command performance, wherein, in a case a PDP context is already activated for a mobile equipment application prior to said specific command from the UICC, and in a case current parameters of the already activated PDP context fit UICC needs, said transmitter is operable to notify the UICC about parameters of the already activated PDP context.

\* \* \* \* \*